United States Patent [19]
Horvath

[11] B 3,921,197
[45] Nov. 18, 1975

[54] DIRECT CURRENT POWER CONVERTER

[75] Inventor: Sandor J. Horvath, 4556 D St., Philadelphia, Pa. 19120

[73] Assignee: Eltra Corporation, Toledo, Ohio

[22] Filed: Nov. 27, 1973

[21] Appl. No.: 419,327

[44] Published under the Trial Voluntary Protest Program on January 28, 1975 as document no. B 419,327.

[52] U.S. Cl. .................. 321/18; 320/39; 331/110
[51] Int. Cl.$^2$ ........................................ H02M 3/315
[58] Field of Search ............ 320/39, 40; 321/18, 45; 331/110

[56] References Cited
UNITED STATES PATENTS

| | | | |
|---|---|---|---|
| 3,119,057 | 1/1964 | Wilson .......................... | 321/45 R X |
| 3,343,062 | 9/1967 | Mesenhimer .................. | 321/45 R X |
| 3,602,794 | 8/1971 | Westhaver ..................... | 323/22 T X |
| 3,652,916 | 3/1972 | Ballman .......................... | 320/40 X |
| 3,671,843 | 6/1972 | Huntzinger ..................... | 320/40 X |

Primary Examiner—R. N. Envall, Jr.
Attorney, Agent, or Firm—Vincent L. Barker, Jr.; Oliver E. Todd, Jr.

[57] ABSTRACT

A power regulation system for use in electric drive vehicles having a direct current power supply of a relatively high voltage and which requires a source of relatively low direct current for auxiliary purposes, such as for charging a 12 volt auxiliary battery which operates an electrical system in the vehicle other than the drive train. The system includes a converter having a full wave transistor bridge oscillator operable to apply high frequency input to the primary of a step-down power transformer. The rectified output of the secondary of the power transformer is connected across the low voltage battery. Charging current control is achieved by a Schmitt trigger voltage sensor connected across the low voltage battery to deactivate or activate the converter at the upper or lower ends of a predetermined low voltage range.

3 Claims, 2 Drawing Figures

DIRECT CURRENT POWER CONVERTER

BACKGROUND OF THE INVENTION

Direct current mobile apparatus such as electric vehicles utilize a relatively high voltage battery pack which is maintained under a fixed charging routine under regular maintenance procedures. Such vehicles, whose main battery plant may operate at voltages in the range of 72–156 volts often includes an auxiliary 12 volt battery used for lights, wipers, etc. which is not maintained on the routine charging schedule and therefore, is preferably kept in charged state by drawing power from the primary power pack.

In providing a system for this purpose, it is desirable that such system be operable over a wide range of input voltage, such as systems having a nominal voltage at 72, 84, 96, 112, or 156 volts. Due to high demands placed upon the power pack when such an electric vehicle is operating at full power, the supply battery voltage is variable from the nominal rating and the converter must be able to successfully operate throughout this range of voltage variations.

In addition, it is desirable that the circuit have the capability of monitoring the charge on the auxiliary battery so that the converter system will function to charge the auxiliary battery when its voltage falls below the lower end of a predetermined range and to be inactivated when the battery charge falls above the upper end of the predetermined range.

SUMMARY OF THE INVENTION

The power regulation system of this invention consists of a voltage converter designed to operate under a variable input direct current voltage, as from the electric vehicle's battery pack. A high frequency alternating voltage is applied to the primary of a step-down power transformer. A saturable core transformer having a primary in parallel with the primary of the power transformer controls the conduction of a full wave transistor bridge network which applies current to the primary of the power transformer. The high frequency, low voltage output from the secondary of the power transformer is rectified and applied to charge the 12 volt auxiliary battery. Regulation of the charging current is provided by a Schmitt trigger configuration which operates to activate or deactivate the converter when the load (auxiliary battery) voltage falls below and above a predetermined low voltage range. The Schmitt trigger circuitry is operated to open circuit the entire system through use of a relay in the power circuit when the load (auxiliary battery) voltage exceeds the upper end of the low voltage range. Hysteresis in the Schmitt trigger maintains the open circuit until the voltage drops below the low voltage range. A variable resistor may be used to locate the operating range of the voltage sensing network.

DESCRIPTION OF A PREFERRED EMBODIMENT

Figure 1:
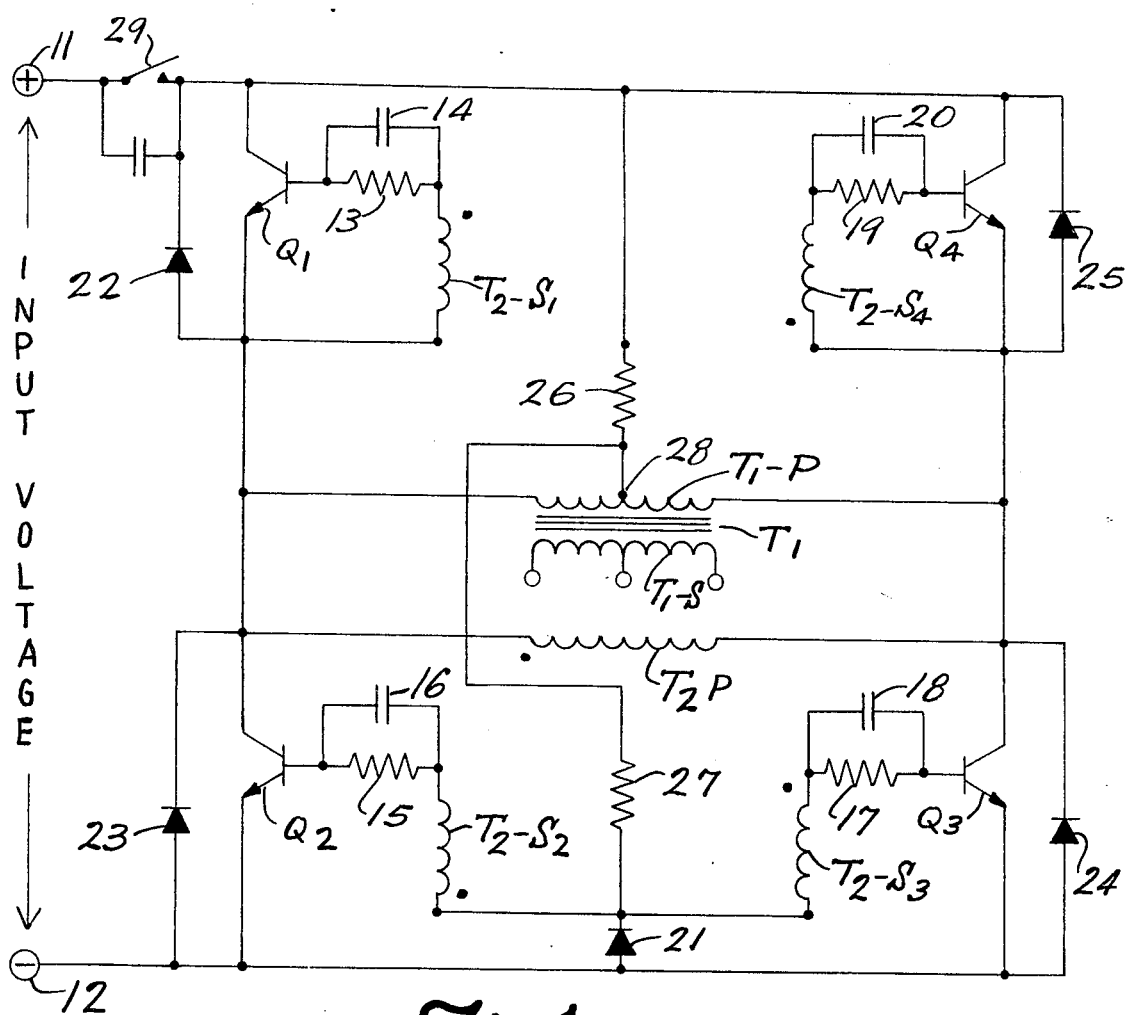
FIG. 1 is a circuit diagram of the power transformer exciting portion of a converter of a preferred embodiment of the present invention.

Referring first to FIG. 1, the converter portion of the system of this invention includes a pair of terminals 10 and 11 for connection across the high direct current voltage source, such as the main battery pack of an electrical vehicle which may be nominally between 72–156 volts and may vary as much as ± 10 percent or more. A full wave transistor bridge circuit, including transistors $Q_1$–$Q_4$, is connected across the terminals 11 and 12 with the primary winding of a power transformer $T_1$ connected to the output of the transistor bridge. The primary of the power transformer $T_1$ is in series with the emitter-collector circuits of the transistors $Q_1$ and $Q_3$ so that the simultaneous conduction by these two transistors will cause current flow between the terminals 11 and 12 in one direction through the transformer primary $T_1$-P. The primary $T_1$-P of the power transformer $T_1$ is also in series with the emitter-collector circuits of the transistors $Q_2$ and $Q_4$ so that conduction by these transistors will cause current flow in the opposite direction through the primary $T_1$-P. Alternate conduction by the pairs of transistors $Q_1$–$Q_3$, and $Q_2$–$Q_4$ provides an induced alternating low voltage in the secondary $T_1$-S of the power transformer $T_1$ which is rectified by the output circuit of FIG. 2 and then applied to the low voltage load such as the auxiliary 12 volt battery, as described below.

The full-wave transistor bridge configuration including the transistors $Q_1$–$Q_4$ is controlled by a saturable, toroidal core control transformer $T_2$ having a primary winding $T_2$-P connected in parallel with the power transformer primary $T_1$-P. The secondary of the control transformer $T_2$ includes four identical windings $T_2$-$S_1$ through $T_2$-$S_4$, each of which is associated with the control electrode or base of a transistor $Q_1$–$Q_4$, respectively. The secondary winding $T_2$-$S_1$ is connected in the emitter base circuit of transistors $Q_1$ through a parallel RC circuit comprising a resistor 13 and a capacitor 14, while the secondary winding $T_2$-$S_2$ is connected through an RC current comprising a resistor 15 and a capacitor 16 to the base of the transistor $Q_2$, the secondary winding $T_2$-$S_3$ is connected through an RC circuit comprising a resistor 17 and a capacitor 18 to the base of the transistor $Q_3$, and the secondary winding $T_2$-$S_4$ is connected through an RC circuit comprising a resistor 19 and a capacitor 20 to the base of the transistor $Q_4$. A diode 21 is connected from a junction between the secondary windings $T_2$-$S_2$ and $T_2$-$S_3$ to the terminal 12 which is connected to the emitters of the transistors $Q_2$ and $Q_3$. Four diodes 22-25 are connected across the transistors $Q_1$–$Q_4$ respectively, as shown, to protect these transistors against sharp voltage transients. A conventional transient voltage suppressor (not shown) can also be optionally connected directly across the terminals 11 and 12.

A pair of resistors 26 and 27 are connected as a voltage divider across the terminals 11 and 12, through the diode 21, with the junction between these resistors connected to a center tap 28 on the primary of the power transformer $T_1$. Finally, relay contacts 29, shown in open position, are placed between the terminal 11 and the transistor bridge to inactivate the entire transistor bridge converter when opened by its winding, as explained below. A parallel capacitor may be used to protect the relay contacts 29 from arcing.

Operation of the converter portion of the system is as follows. When the relay contacts 29 are initially closed to activate the system, direct current flows between terminals 11 and 12 through the path of the resistor 26, through both halves of the primary winding of power transformer $T_1$ and thence through the transistors $Q_2$ and $Q_3$. However, the currents through the halves of the primary winding $T_1$-P will not be identical for several reasons. First, there will be at least a small difference between the resistance of the two halves of the primary $T_1$-P due to, for example, a buildup of wire on the core of $T_1$ resulting in different wire lengths in the two halves even though the two halves have the same number of turns. Furthermore, no two transistors have identical characteristics. Operating parameters of two transistors having identical ratings may vary as much as several hundred percent. Thus, one of the transistors $Q_2$ or $Q_3$ will tend to conduct more than the other. The resistance of the transformer coils $T_2$-$S_2$ and $T_2$-$S_3$ will also affect initial conduction of the transistors $Q_2$ and $Q_3$. Again, wire buildup on the transformer core will prevent the transformer coils $T_2$-$S_2$ and $T_2$-$S_3$ from being identical. This circuitry makes the transistor bridge unstable to the point where conduction by one of the transistors $Q_2$ or $Q_3$ starts much more rapidly than the other. The diodes 22 and 25 are reverse biased and prevent conduction in the opposite direction. Once one transistor, $Q_2$ for example, starts conduction much more rapidly than the other transistor $Q_3$, the current path will include the primary $T_1$-P of the power transformer $T_1$ and the primary $T_2$-P of the control transformer $T_2$. As soon as a current flow starts in $T_2$-P, the transistor $Q_4$, which is diagonally opposite to the conducting transistor $Q_2$, is biased by $T_2$-$S_4$ to start conducting. Current in this path continues to the point where the core of the control transformer $T_2$ saturates, at which time the induced voltage across the secondary winding $T_2$-$S_2$ goes to zero and the current applied to the control electrode of the transistor $Q_2$ ceases, thus turning off transistor $Q_2$. $Q_4$ is turned off in a similar manner. The field then collapses in the core of the saturated transformer $T_2$, inducing opposite polarity voltages across the secondary windings $T_2$-$S_1$ and $T_2$-$S_3$ which turn on the transistors $Q_1$ and $Q_3$ to apply a current through their emitter-collector circuits and through the primary windings of the power and control transformers $T_1$ and $T_2$ but in the opposite direction from the initial current, thus inducing a reversed polarity voltage across the secondary $T_1$-S of the power transformer $T_1$ and maintaining the voltage across the secondary windings $T_2$-$S_1$ and $T_2$-$S_3$ of the control transformer $T_2$. These voltages continue until saturation of the core of the control transformer $T_2$, at which time the transistors $Q_1$ and $Q_3$ turn off and the transistors $Q_2$ and $Q_4$ are turned on by voltages induced across the secondary windings $T_2$-$S_2$ and $T_2$-$S_4$ by the collapsing field in the core of the transformer $T_2$. Thus alternate conduction continues to produce a high frequency, low voltage current in the secondary of the power transformer $T_1$. The resistors 13, 15, 17 and 19 control the saturation time for the core of the control transformer $T_2$ and thus determine frequency of converter output. The capacitors 14, 16, 18 and 20 accelerate response time of the system to speed up the turn-on and turn-off times of the transistors $Q_1$–$Q_4$. Depending upon the applied voltage across the terminals 11 and 12, the output frequency of the converter in this preferred embodiment may operate at 18 to 22 K Hz, for example.

Figure 2:
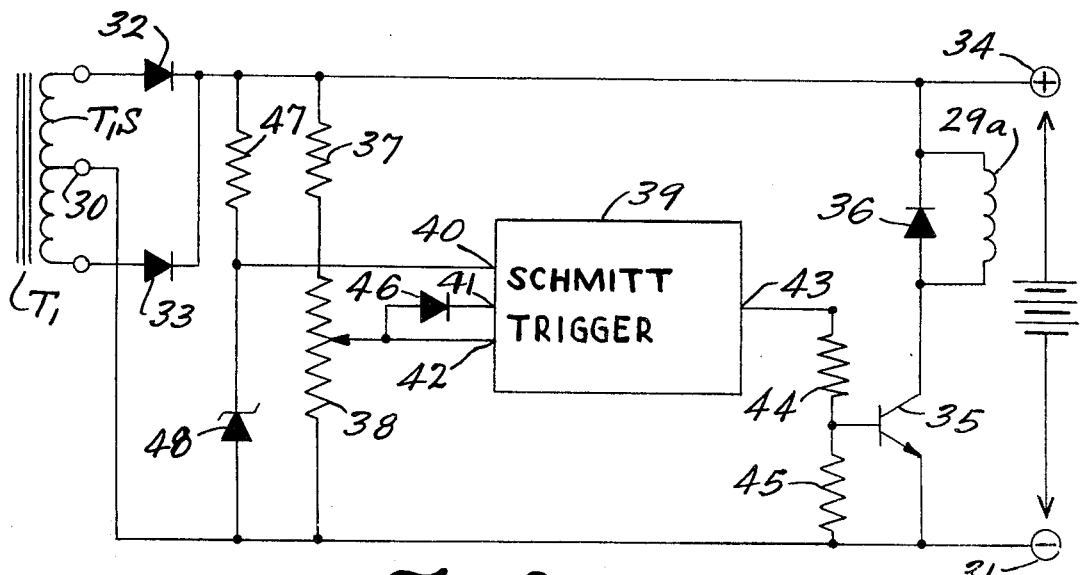
FIG. 2 is a circuit diagram of the output and control portion of the converter of the present invention.

Referring to FIG. 2, the secondary winding $T_1$-S of the power transformer has a center tap 30 connected to a load terminal 31 and ends connected through diodes 32 and 33, respectively, to the other load terminal 34.

The output of transformer $T_1$ is full wave rectified by the diodes 32 and 33.

The voltage regulation portion of the system includes a winding 29a for operating the relay contacts 29 shown in FIG. 1 which is connected across the terminals 30 and 34 in series with the main conduction path of a transistor 35. A diode 36 is connected across the relay winding 29a to protect the transistor 35.

A voltage divider including a resistor 37 and a potentiometer 38 extends across the terminals 34 and 31. The potentiometer 38 has its adjustable tap connected to a Schmitt trigger type control circuit 39 shown in block form. The potentiometer 38 establishes the voltage level for triggering the Schmitt trigger 39. This control circuit 39 has a supply voltage input 40, two inputs 41 and 42 and a single output 43. The output 43 is connected to the control electrode of the transistor 35 through a resistor voltage divider including resistors 44 and 45. The tap of potentiometer 38 is directly connected to input 42 and to input 41 through a diode 46. The Schmitt trigger 38 is powered from a regulated source comprising a resistor 47 and a Zener diode 48 connected across the terminals 34 and 31. Operation of the control circuit is as follows:

The Schmitt trigger 39 may be of a conventional design, such as a trigger formed from two NAND-gates, capacitors and resistors. The single output 43 is applied to the control electrode of the transistor 35 to turn on this transistor 35, thus energizing the relay winding 29a to close the relay contact 29, thereby activating the entire converter system. The inputs 41 and 42 to the Schmitt trigger 39 monitor the voltage between terminals 31 and 34, as reduced to a lower level by resistor 37 and potentiometer 38. The diode 46, having a forward bias voltage drop of about 0.5 volts, sets the hysteresis level for the Schmitt trigger 39 such that a narrow range of load voltage variations can be tolerated. For example, if the load is an auxiliary battery for an electrical vehicle, the system can be adjusted through selection of various resistors such that the battery will be charged when its voltage drops below 13.2 volts and will remain on charge until its voltage exceeds 13.7 volts. The battery voltage is sensed across terminals 31 and 34 and when below 13.2 volts, the corresponding voltage applied to input terminals 41 and 42 will drop to the level at which the Schmitt trigger 39 will turn on to turn on transistor 55, thereby closing the relay contacts 29 and starting the converter which charges the battery. When battery voltage reaches 13.7 volts the reverse sequence takes place.

The construction and operation of the Schmitt trigger control circuit will be apparent to those skilled in the art. It may incorporate conventional transistors or utilize one of a number of commercial available integrated circuits.

From the above description of a preferred embodiment, it will be seen that the converter of this invention provides a means for providing a regulated low voltage direct current source for charging or other auxiliary purposes which is powered by a higher voltage direct current source whose voltage is subject to variation in use. The system is particularly adapted for use in electric vehicles as described above but can be used in other installations where a regulated low voltage direct current source is desired. Other advantages and applications of the invention will be apparent to those skilled in the art and various modifications may be made without departing from the scope and spirit of the following claims.

I claim:

1. A voltage converter for operating from a DC power supply having a regulated DC output voltage of a value different from the supply voltage, comprising, in combination, a power transformer having primary and secondary windings, oscillator means for connecting said primary winding to said power supply, said oscillator means including a full wave transistor bridge connecting said primary winding alternately in opposite polarity to said power supply for inducing an alternating current at a different voltage in said secondary winding and a saturable reactor having a primary winding connected in parallel with said power transformer primary winding and having a plurality of secondary windings connected to control conduction of current control transistors in said transistor bridge, means for rectifying said induced secondary current and applying the rectified voltage across a pair of load terminals, and regulator means for monitoring the voltage across said load terminals for deactivating said oscillator means when such voltage exceeds a predetermined maximum value and for activating said oscillator means when such voltage drops below a predetermined minimum value, said regulator means including voltage responsive electronic switch means having an input connected across said load terminals and an output operably connected to a means effective to disable said oscillator means, such that variations in such load terminal voltage above or below said predetermined maximum or minimum values will cause said switch means to change from one state to another to deactivate and activate said oscillator means.

2. A voltage converter, as set forth in claim 1, wherein said regulator means includes a Schmitt trigger, means connecting said Schmitt trigger to said load terminals for sensing the voltage across said load terminals, said Schmitt trigger having an output which changes from one state to another when the load terminal voltage exceeds said predetermined maximum, means for preventing said Schmitt trigger from return to said one state until the load terminal voltage drops below said predetermined minimum, and means for disabling said oscillator means when said Schmitt trigger is in said other state.

3. A voltage converter, as set forth in claim 2, wherein said means connecting said Schmitt trigger to said load terminals includes means for changing the predetermined maximum load terminal voltage at which said Schmitt trigger changes from said one state to said other state.

* * * * *